(12) United States Patent
Takagi et al.

(10) Patent No.: US 8,589,614 B2
(45) Date of Patent: Nov. 19, 2013

(54) NETWORK SYSTEM WITH CROSSBAR SWITCH AND BYPASS ROUTE DIRECTLY COUPLING CROSSBAR INTERFACES

(75) Inventors: Yuzo Takagi, Kawasaki (JP); Takashi Toyoshima, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 257 days.

(21) Appl. No.: 12/805,588

(22) Filed: Aug. 6, 2010

(65) Prior Publication Data

US 2011/0035530 A1 Feb. 10, 2011

(30) Foreign Application Priority Data

Aug. 10, 2009 (JP) ................................. 2009-185893

(51) Int. Cl.
*G06F 13/00* (2006.01)
(52) U.S. Cl.
USPC .......................................... 710/317; 710/316
(58) Field of Classification Search
USPC ................................................. 710/316, 317
See application file for complete search history.

(56) References Cited

U.S. PATENT DOCUMENTS

| | | | |
|---|---|---|---|
| 5,175,824 A | 12/1992 | Soderbery et al. | |
| 5,179,715 A | 1/1993 | Andoh et al. | |
| 5,822,605 A * | 10/1998 | Higuchi et al. | 712/11 |
| 5,898,826 A * | 4/1999 | Pierce et al. | 714/4.2 |
| 5,937,176 A * | 8/1999 | Beasley et al. | 710/317 |
| 6,094,434 A | 7/2000 | Kotzur et al. | |
| 6,680,915 B1 * | 1/2004 | Park et al. | 370/254 |
| 6,728,258 B1 | 4/2004 | Okada et al. | |
| 6,751,699 B1 * | 6/2004 | Langley et al. | 710/317 |
| 6,757,777 B1 * | 6/2004 | Griessbach et al. | 710/316 |
| 6,789,173 B1 * | 9/2004 | Tanaka et al. | 711/147 |
| 6,915,389 B2 * | 7/2005 | Fujimoto | 711/148 |
| 6,973,078 B2 * | 12/2005 | Ma | 370/359 |
| 7,088,678 B1 * | 8/2006 | Freed et al. | 370/230 |
| 7,594,061 B2 * | 9/2009 | Shen et al. | 710/317 |
| 7,852,836 B2 * | 12/2010 | Scott et al. | 370/388 |
| 7,873,693 B1 * | 1/2011 | Mehrotra et al. | 709/203 |
| 8,001,266 B1 * | 8/2011 | Gonzalez et al. | 709/238 |
| 8,151,088 B1 * | 4/2012 | Bao et al. | 712/11 |
| 8,306,042 B1 * | 11/2012 | Abts | 370/401 |
| 2003/0163649 A1 * | 8/2003 | Kapur et al. | 711/146 |
| 2004/0022094 A1 | 2/2004 | Radhakrishnan et al. | |

(Continued)

FOREIGN PATENT DOCUMENTS

| | | |
|---|---|---|
| EP | 0 493 934 A2 | 7/1992 |
| JP | 63-289666 | 11/1988 |

(Continued)

OTHER PUBLICATIONS

Wang, K.; Wu, C.-K., "Design and implementation of fault-tolerant and cost effective crossbar switches for multiprocessor systems," Computers and Digital Techniques, IEE Proceedings—, vol. 146, No. 1, pp. 50-56, Jan. 1999.*

(Continued)

*Primary Examiner* — Faisal M Zaman
(74) *Attorney, Agent, or Firm* — Staas & Halsey LLP

(57) ABSTRACT

A network system includes a crossbar switch, and a plurality of crossbar interfaces having ports connected to the crossbar switch. A bypass route directly connects crossbar interfaces forming a group in which a frequency of use of the ports is greater than or equal to a predetermined value amongst the plurality of crossbar interfaces.

16 Claims, 10 Drawing Sheets

(56) References Cited

U.S. PATENT DOCUMENTS

| | | |
|---|---|---|
| 2005/0044320 A1* | 2/2005 | Olukotun .................. 711/118 |
| 2005/0100035 A1* | 5/2005 | Chiou et al. ............... 370/412 |
| 2005/0195808 A1* | 9/2005 | Chen et al. ................ 370/386 |
| 2007/0140240 A1* | 6/2007 | Dally et al. ................ 370/389 |
| 2008/0211538 A1  | 9/2008 | Lajolo et al. |
| 2009/0024833 A1* | 1/2009 | Deneroff et al. ............ 712/29 |

FOREIGN PATENT DOCUMENTS

| | | | |
|---|---|---|---|
| JP |     02100151 A | * | 4/1990 |
| JP |     08077127 A | * | 3/1996 |
| JP |     08-087480  |   | 4/1996 |
| JP |     10-215266  |   | 8/1998 |
| JP |     11-212866  |   | 8/1998 |
| JP |     11212866 A | * | 8/1999 |
| JP |   2000348000 A | * | 12/2000 |
| JP |   2002-328838  |   | 11/2002 |
| JP |   2010079362 A | * | 4/2010 |
| JP |   2010218364 A | * | 9/2010 |
| JP |   2011039744 A | * | 2/2011 |

OTHER PUBLICATIONS

Deng Pan; Yuanyuan Yang, "Providing flow based performance guarantees for buffered crossbar switches," Parallel and Distributed Processing, 2008. IPDPS 2008. IEEE International Symposium on , pp. 1-12, Apr. 14-18, 2008.*

Webb, B.; Louri, A., "A class of highly scalable optical crossbar-connected interconnection networks (SOCNs) for parallel computing systems," Parallel and Distributed Systems, IEEE Transactions on , vol. 11, No. 5, pp. 444-458, May 2000.*

Gang Han; Klenke, R.H.; Aylor, J.H., "Performance modeling of hierarchical crossbar-based multicomputer systems," Computers, IEEE Transactions on , vol. 50, No. 9, pp. 877-890, Sep. 2001.*

European Search Report dated Oct. 28, 2010 and issued in corresponding European Patent Application 10171928.4.

European Search Report dated Jul. 4, 2011 in corresponding European Patent Application 10171928.4.

Japanese Office Action issued on Oct. 1, 2013 in copending Japanese Patent Application No. 2009-185893.

* cited by examiner

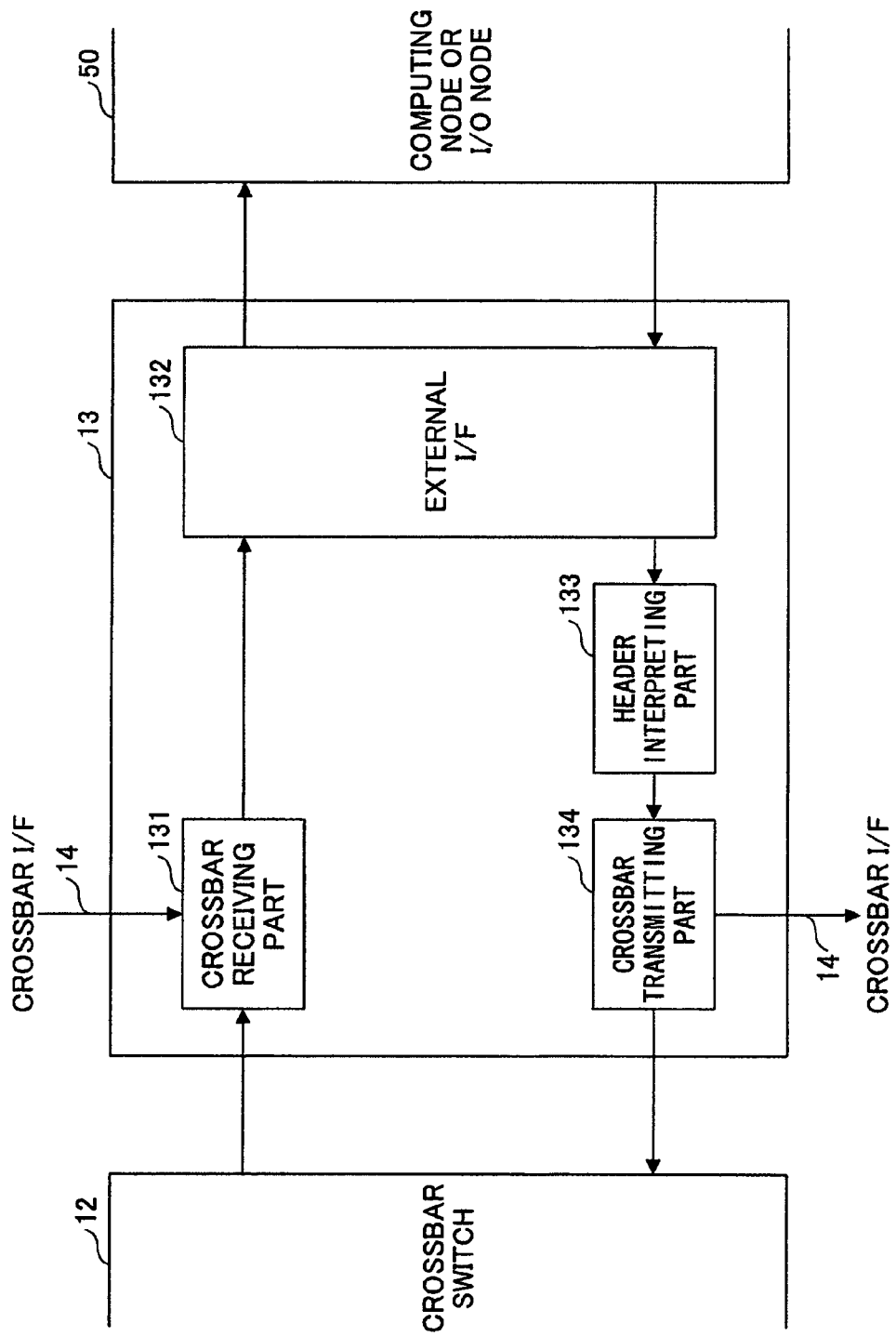

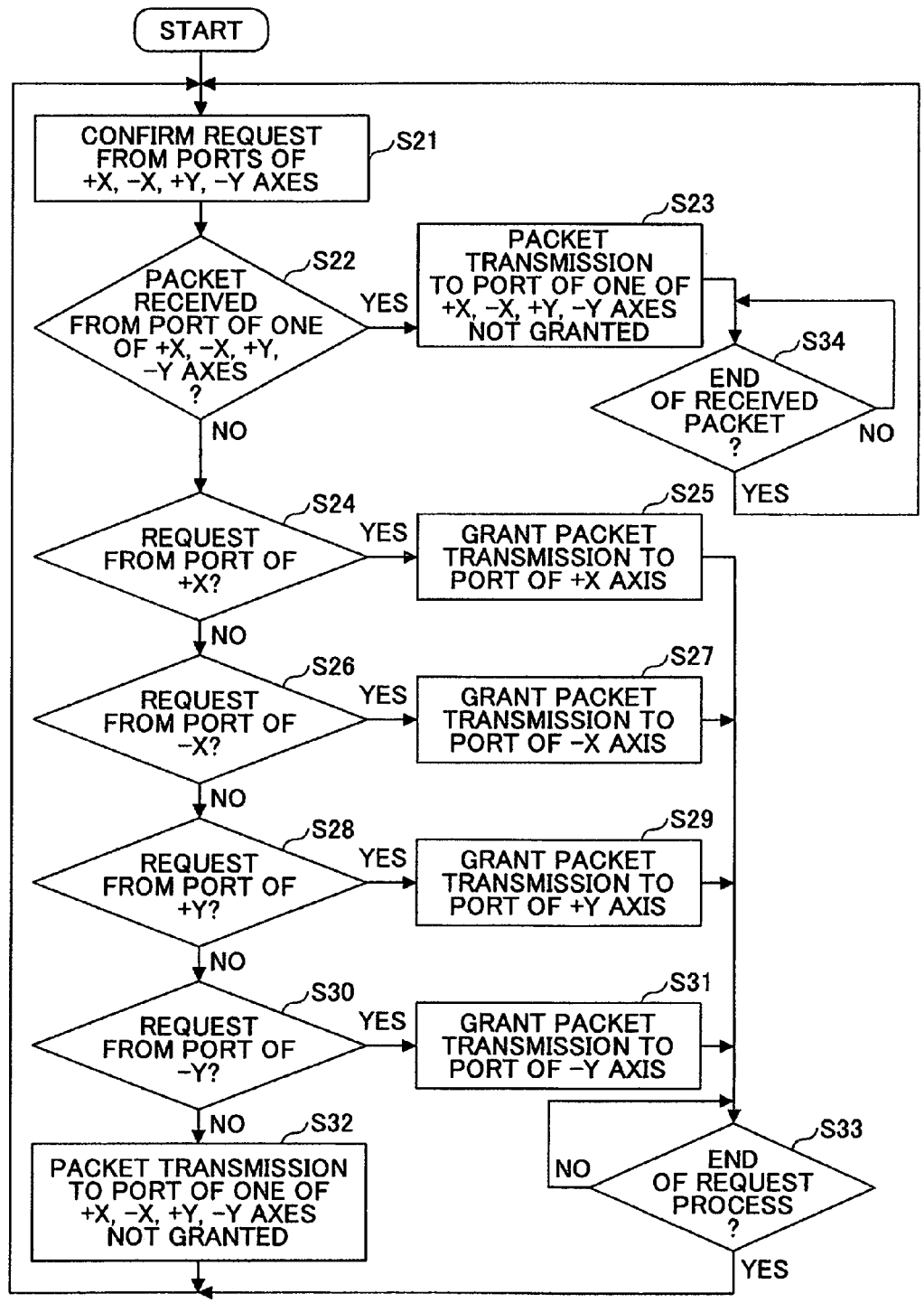

NETWORK SYSTEM WITH CROSSBAR SWITCH AND BYPASS ROUTE DIRECTLY COUPLING CROSSBAR INTERFACES

CROSS-REFERENCE TO RELATED APPLICATIONS

This application is based upon and claims the benefit of priority of the prior Japanese Patent Application No. 2009-185893, filed on Aug. 10, 2009, the entire contents of which are incorporated herein by reference.

FIELD

The present invention relates to network systems, information processing apparatuses, and control methods for network systems.

BACKGROUND

Performances of information processing apparatuses, such as computers, continue to improve every year. However, due to limits in reducing the size of semiconductor circuits and the saturation of a curve with which the operation clock frequency of the semiconductor circuits have increased, there is a limit to improving the performance of processors, such as CPUs (Central Processing Units). For this reason, a further improvement in the performance recently relies upon parallel computing of a parallel computer using a plurality of processors.

The performance of the parallel computer not only depends on the computation speed of each processor itself, but also depends on the communication speed or the time required for the processors to communicate with each other. Because there is a limit to improving the performance of the processor itself according to the existing technology, it is necessary to improve the communication speed between the processors in order to further improve the performance of the parallel computer. The communication speed in the parallel computer may be roughly categorized into two elements, namely, a latency corresponding to a data transfer time, and a bandwidth corresponding to a bandwidth of the data transfer.

The latency is the time it takes for the data communication to start and end, and the communication speed improves as the latency becomes shorter. However, when the structure of the parallel computer is made complex in order to improve the performance of the parallel computer, the logic becomes complex and the number of transistors that are used considerably increases, to thereby generate signal delays and deteriorate the latency. In addition, the effects of the latency accumulate as the scale of the parallel computer becomes larger, and makes it more difficult to further improve the performance of the parallel computer system as a whole.

On the other hand, the bandwidth is the criterion representing the amount of data that can be transferred in one transfer. Naturally, it is desirable to transfer a large amount of data in one transfer. However, when the amount of data to be transferred in one transfer is simply increased, the number of bits to be transferred in one transfer increases. As a result, the number of transistors used for transferring and holding the data increases, to thereby increase the area of a semiconductor chip occupied by a LSI (Large Scale Integrated) circuit that forms the parallel computer. Consequently, it takes time to synchronize the data transfer when the number of bits to be transferred in one transfer increases, to thereby deteriorate the latency.

FIG. 1 is a block diagram for explaining an example of a conventional network system (or network architecture). FIG. 1 illustrates a network system 1 using a two-dimensional mesh topology, such as the two-dimensional mesh torus topology. As illustrated in FIG. 1, the network system 1 includes a crossbar switch 2, and crossbar interfaces (I/Fs) 3-1 through 3-4 that are connected to the crossbar switch 2. All data from each of the crossbar interfaces 3-1 through 3-4 is redistributed to the crossbar interfaces 3-1 through 3-4 via the crossbar switch 2.

A node 5 is connected to each of the crossbar interfaces 3-1 through 3-4. The node 5 is formed by a computing node such as a processor or, an I/O (Input and Output) node. At least one of the four nodes 5 in FIG. 1 is a computing node. The network system 1 and the four nodes 5 form an information processing apparatus. A parallel computer is formed when two or more nodes 5 are formed computing nodes.

As may be seen from FIG. 1, the latency and the bandwidth have a tradeoff relationship not only in computers, but also in network systems. It is difficult to improve both the latency and the bandwidth.

Therefore, the conventional computes and network systems suffered problems in that it is possible to improve both the latency and the bandwidth simultaneously.

The applicant is aware of Japanese Laid-Open Patent Publications No. 11-212866, No. 2002-328838, and No. 10-215266.

SUMMARY

Accordingly, it is a general object of the present invention to provide a novel and useful network system, information processing apparatus, and control method for network system, in which the problems described above are suppressed.

Another and more specific object of the present invention is to provide a network system, an information processing apparatus, and a control method for the network system, which may simultaneously improve both the latency and the bandwidth.

According to one aspect of the present invention, there is provided a network system comprising a crossbar switch; a plurality of crossbar interfaces having ports coupled to the crossbar switch; and a bypass route directly coupling crossbar interfaces forming a group in which a frequency of use of the ports is greater than or equal to a predetermined value amongst the plurality of crossbar interfaces.

According to one aspect of the present invention, there is provided an information processing apparatus comprising a first computing node configured to perform a first computation and to transmit a packet; a first crossbar interface coupled to the first computing node and configured to transfer the packet transmitted from the first computing node; a crossbar switch configured to receive the packet from the first computing node coupled thereto and to switch a communication channel of the packet; a second crossbar interface coupled between the crossbar switch and the first crossbar interface, configured to transfer the packet from the crossbar switch or the first crossbar interface; and a second computing node configured to receive the packet from the second crossbar interface coupled thereto and to perform a second computation.

According to one aspect of the present invention, there is provided an information processing apparatus comprising a crossbar switch; a plurality of nodes; a plurality of crossbar interfaces, having a plurality of ports, and coupled between the crossbar switch and the plurality of nodes; and a bypass route directly coupling crossbar interfaces forming a group in which a frequency of use of the ports is greater than or equal to a predetermined value amongst the plurality of crossbar interfaces, wherein the plurality of nodes include at least one computing node and at least one input and output node.

According to one aspect of the present invention, there is provided a control method for a network system, comprising transmitting a packet from a first computing node configured to perform a first computation; transferring a packet transmitted from the first computing node by a first crossbar interface that is coupled to the first computing node; receiving, by a crossbar switch, the packet from the first computing node that is coupled to the crossbar switch, and switching a communication channel of the packet; transferring the packet from the crossbar switch or the first crossbar interface by a second crossbar interface that is coupled to the crossbar switch and the first crossbar interface; and receiving the packet transferred by the second crossbar interface by a second computing node configured to perform a second computation.

According to one aspect of the present invention, there is provided a control method for a network system, comprising transferring a packet received by a first crossbar interface to a crossbar switch; switching, by the crossbar switch, a communication channel for the packet received from the first crossbar switch based on a communication channel selecting algorithm and transferring the packet to the communication channel determined thereby; and receiving through a bypass route the packet from the crossbar switch or the packet from the first crossbar interface by a second crossbar interface that is coupled to the crossbar switch and the first crossbar interface.

Other objects and further features of the present invention will be apparent from the following detailed description when read in conjunction with the accompanying drawings.

BRIEF DESCRIPTION OF THE DRAWINGS

FIG. 9 is a block diagram for explaining an example of a crossbar interface; and FIG. 10 is a flow chart for explaining an operation of the crossbar switch.

DESCRIPTION OF EMBODIMENTS

Figure 1:
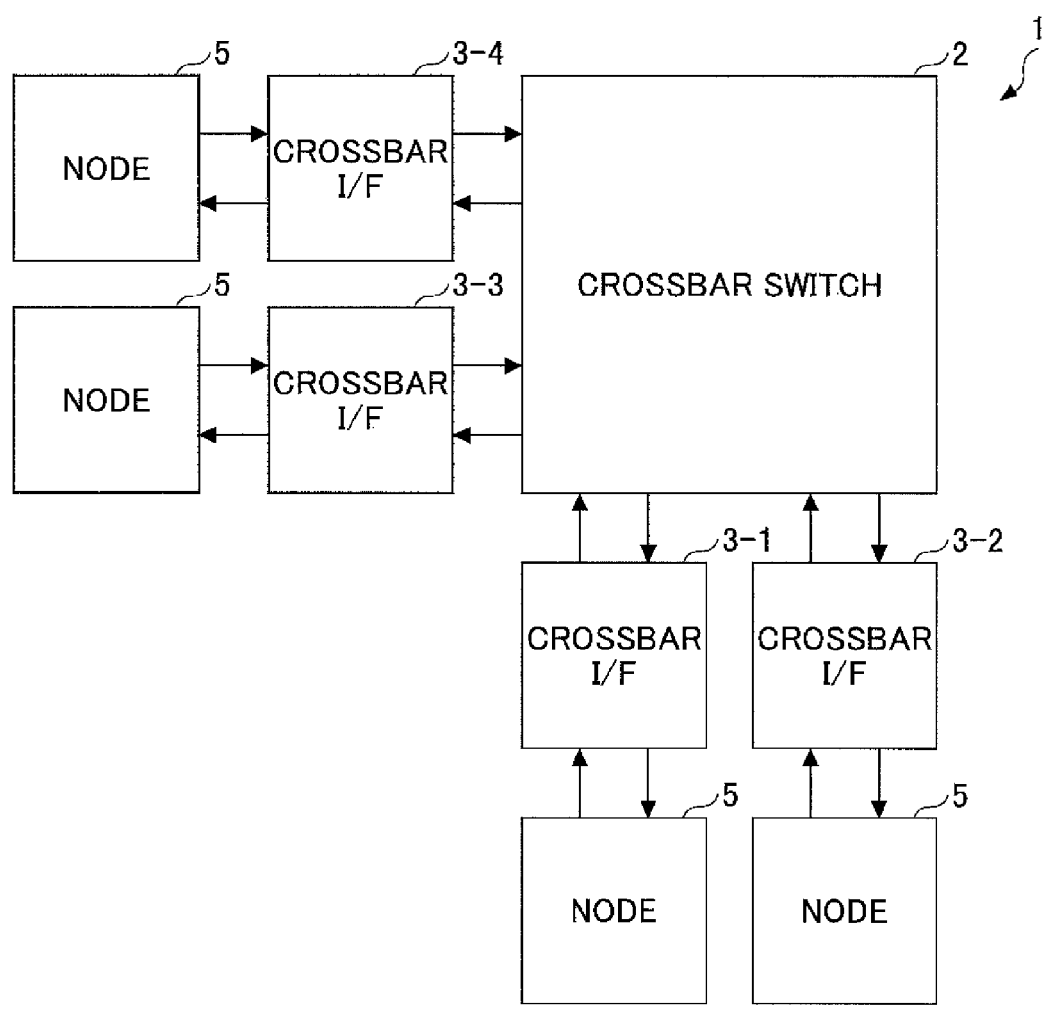
FIG. 1 is a block diagram for explaining an example of a conventional network system.

The disclosed network system, information processing apparatus, and control method for the network system, both the latency and the bandwidth are improved by focusing attention on a bias of communication channels, that is, a bias in a frequency of use of ports (or data communication frequency). By simultaneously improving both the latency and the bandwidth, it is possible to improve the performance of the information processing apparatus, such as parallel computers.

A description will now be given of embodiments of the disclosed network system, information processing apparatus, and control method for the network system, by referring to the drawings.

Many parallel computers employ a communication channel selecting algorithm that avoids deadlock, such as the DOR (Dimension Order Routing) that logically avoids the deadlock. When such a communication channel selecting algorithm is employed, a set of ports having a relatively large bias of the communication channels or a relatively high frequency of use (or data communication frequency) and a set of ports having a relatively small bias of the communication channel or a relatively low frequency of use (or data communication frequency) are generated.

For example, when the DOR is employed in the two-dimensional mesh topology, data passing through a distributed switched network, such as crossbar switch, are transferred by selecting the communication channels to first match a X-coordinate of target (or destination) node coordinates and to then match a Y-coordinate of the target (or destination) node. All of the data traverse the X-coordinate in the same order when matching the communication channels to the X-coordinate of the target node coordinates, and traverse the Y-coordinate in the same order when matching the communication channels to the Y-coordinate of the target node coordinates, so that the deadlock is avoided. It is assumed for the sake of convenience that the coordinates in the two-dimensional mesh is denoted by (x, y), and that the data is transferred from coordinates (0, 0) to coordinates (n, n). In this case, there are n communications among the ports of the X-axis, n−1 communications among the ports of the Y-axis, and 1 communication between the port of the X-axis and the port of the Y-axis. Hence, the number of communications among the ports of the X-axis and the number of communications among the ports of the Y-axis are large compared to the number of other communications, namely, the communication between the port of the X-axis and the port of the Y-axis.

According to an embodiment, both the latency and the bandwidth are improved by focusing attention on the bias of the communication channels, that is, the bias in the frequency of use of the ports (or data communication frequency). By simultaneously improving both the latency and the bandwidth, it is possible to improve the performance of the information processing apparatus, such as the parallel computers, for example.

Figure 2:
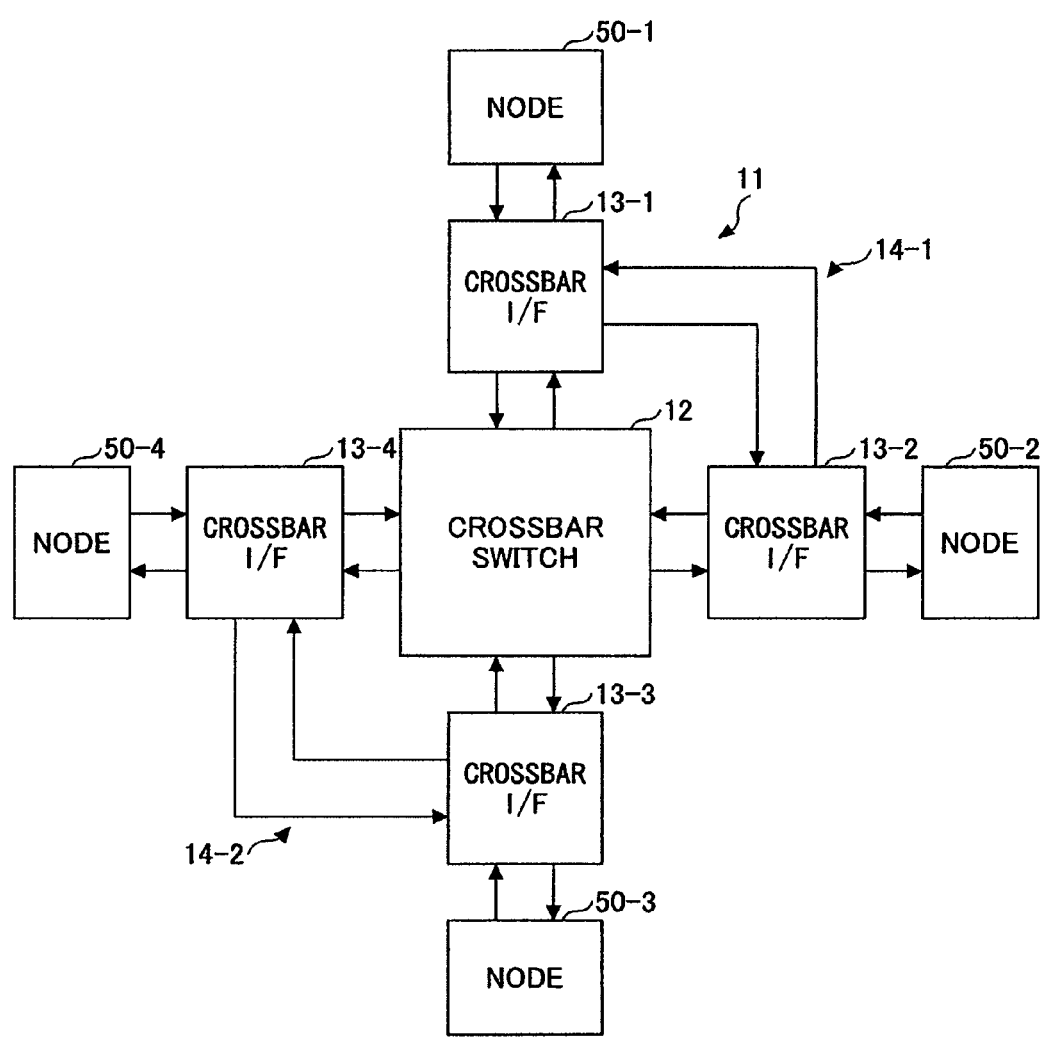
FIG. 2 is a block diagram for explaining an example of a network system in an embodiment.

FIG. 2 is a block diagram for explaining an example of a network system (or network architecture) in an embodiment. FIG. 2 illustrates a network system 11 using a topology selected from a group including a two-dimensional mesh torus topology, a two-dimensional line torus topology, a two-dimensional mesh ring topology, and a two-dimensional line ring topology. As illustrated in FIG. 2, the network system 11 includes a crossbar switch 12, crossbar interfaces (I/Fs) (or switch interfaces (I/Fs)) 13-1 through 13-4 connected to the crossbar switch 12, and bypass routes 14-1 and 14-2. Each of the crossbar interfaces 13-1 through 13-4 forming the ports are connected between the crossbar switch 12 and a corresponding one of nodes 50-1 through 50-4. Each of the nodes 50-1 through 50-4 is formed by a computing node or an I/O (input and output) node. The computing node is formed by a CPU, a processor or the like that executes various computations (or operations), for example. In FIG. 2, at least one of the nodes 50-1 through 50-4 is formed by the computing node. The network system 11 and the four nodes 50-1 through 50-4 form an information processing apparatus, and a parallel computer is formed if two or more nodes among the nodes 50-1 through 50-4 are formed by computing nodes. In other words, the information processing apparatus includes the crossbar switch 12, the crossbar interfaces 13-1 through 13-4, the bypass routes 14-1 and 14-2, and the nodes 50-1 through 50-4.

The data from each of the crossbar interfaces 13-1 through 13-4 is redistributed to the crossbar interfaces 13-1 through 13-4 via the crossbar switch 12 which switches the routes of the data or, is transferred to a corresponding crossbar interface via the bypass route 14-1 or 14-2.

Figure 3:
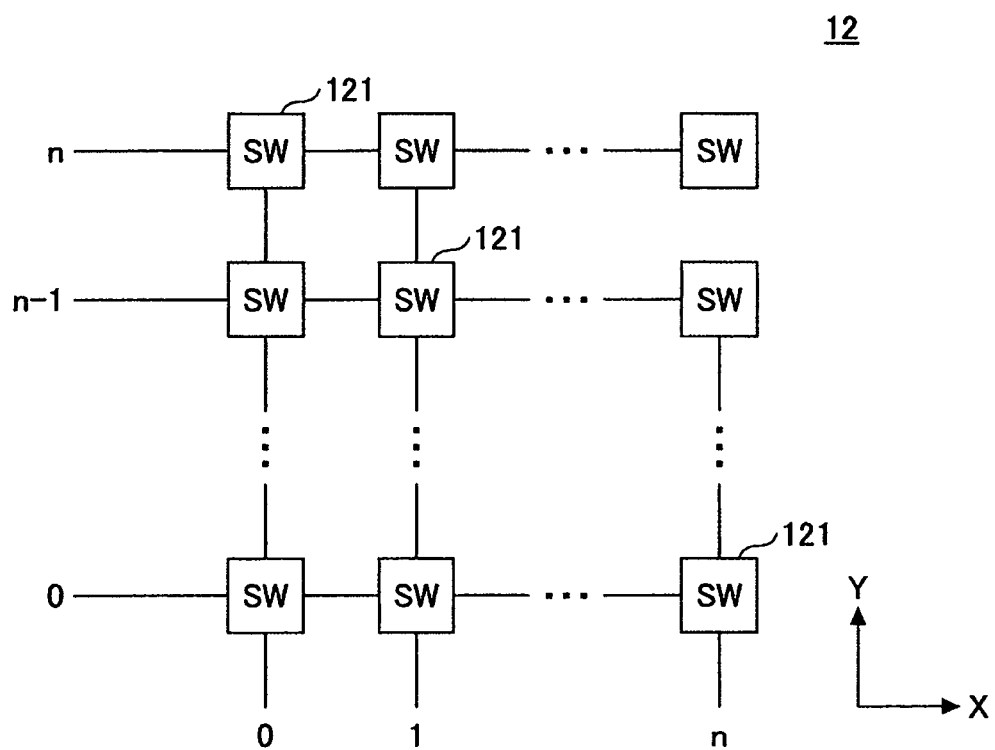
FIG. 3 is a diagram for explaining an example of a crossbar switch.

FIG. 3 is a diagram for explaining an example of the crossbar switch 12. In this example, the crossbar switch 12 includes n switches (SWs) 121 arranged in the X-axis direction, and n switches 121 arranged in the Y-axis direction, where n is a natural number greater than or equal to two. When the coordinates in the two-dimensional mesh is denoted by (x, y) and the data is transferred from coordinates (0, 0) to coordinates (n, n) in the crossbar switch 12 using the topology selected from the group including the two-dimensional mesh torus topology, the two-dimensional line torus topology, the two-dimensional mesh ring topology, and the two-dimensional line ring topology, and employing the DOR (Dimension Order Routing) as the communication channel selecting algorithm, n communications occur among the ports of the X-axis, n−1 communications occur among the ports of the Y-axis, and 1 communication occurs between the port of the X-axis and the port of the Y-axis. In this case, the number of communications among the ports of the X-axis and the number of communications among the ports of the Y-axis are large compared to the number of other communications, namely, the communication between the port of the X-axis and the port of the Y-axis. Hence, the crossbar interfaces 13-1 and 13-2 forming a set of ports of the X-axis having a bias of the communication channels or a frequency of use (or data communication frequency) that is higher than a predetermined value are connected by the bypass route 14-1. In addition, the crossbar interfaces 13-3 and 13-4 forming a set of ports of the Y-axis having a bias of the communication channel or a frequency of use (or data communication frequency) that is higher than a predetermined value are connected by the bypass route 14-2. However, the crossbar interfaces that are connected by the bypass route are of course not limited to those of the example illustrated in FIG. 2.

The crossbar switch 12 having n ports of the X-axis and n ports of the Y-axis is of course not limited to the structure using $n^2$ switches 121 as illustrated in FIG. 3.

For example, in a case where the communication channel selecting algorithm employed is such that the number of communications among the ports of mutually different axes is large compared to the number of communications among the ports of the same axis, the crossbar interfaces 13-1 and 13-4 may be connected by a bypass route, and the crossbar interfaces 13-2 and 13-3 may be connected by a bypass route.

Accordingly, the data transfer between the crossbar interfaces 13-1 and 13-2, for example, which form the set of ports having the bias of the communication channels or the frequency of use (or data communication frequency) that is higher than the predetermined value, is made directly via the bypass route 14-1 without passing through the crossbar switch 12. As a result, the data passing through the bypass route 14-1 is transferred directly between the ports of the crossbar interfaces 13-1 and 13-2, without passing through the crossbar switch 12. For this reason, the data transfer may be made with a low latency compared to the case where the data transfer is made through the crossbar switch 12. In addition, the latency is substantially reduced because a majority of the data transfer through the crossbar interfaces 13-1 and 13-2 is made through the bypass route 14-1.

Furthermore, in a case where the crossbar interface has virtual channels, the provision of the bypass route enables the data passing through the bypass route and other data passing through the crossbar switch 12 to be transferred simultaneously, that is, in parallel, to substantially increase the bandwidth. For example, when transferring a packet from the crossbar interface 13-1 to the crossbar interface 13-2, it is possible to double the bandwidth by transferring the data via the bypass route 14-1 and simultaneously transferring the data via the crossbar switch 12. The format of the packet is not limited to a particular format. However, in the case where the packet has the distributed routing format, the packet may include routing information, such as destination information related to a packet destination and source information related to a packet source. For example, in the case of the packet formed by a header and a data part, the routing information is included in the header of the packet, and the data is included in the data part of the packet.

Of course, FIG. 2 is merely for explaining the connections within the network system 11, and the physical positions of the crossbar interfaces 13-1 through 13-4 with respect to the crossbar switch 12 are not limited to the positions illustrated in FIG. 2. Similarly, the position of each crossbar interface with respect to the crossbar switch illustrated in FIGS. 5 through 8 which will be described later is not the physical position.

Figure 4:
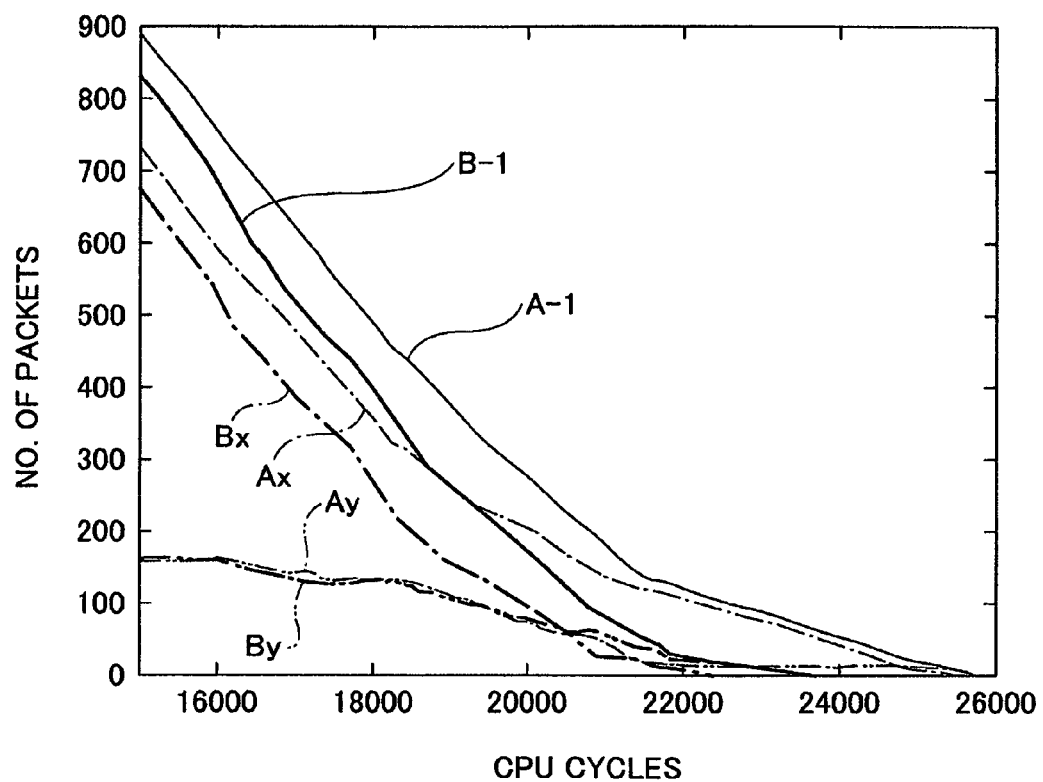
FIG. 4 is a diagram illustrating simulation results of a performance evaluation of a simultaneous communication.

FIG. 4 is a diagram illustrating simulation results of a performance evaluation of a simultaneous communication. In FIG. 4, the ordinate indicates the number of packets not reaching the destination, and the abscissa indicates the elapsed time by the number of CPU cycles. For example, when transferring the packet from the crossbar interface 13-1 to the crossbar interface 13-2 in FIG. 2, the packet is transferred by selecting the communication channels to first match the X-coordinate of the destination node coordinates and to then match the Y-coordinate of the destination node. In FIG. 4, Ax indicates the simulation result of the performance evaluation of the process of matching the communication channel that passes through the crossbar switch 12 to the X-coordinate of the destination node coordinates, Ay indicates the simulation result of the performance evaluation of the process of matching the communication channel that passes through the crossbar switch 12 to the Y-coordinate of the destination node coordinates, and A-1 indicates the simulation result of the performance evaluation of the packet transfer from the crossbar interface 13-1 to the crossbar interface 13-2 through the crossbar switch 12. Hence, the simulation result A-1 corresponds to a simulation result of the performance evaluation that will be obtained for the packet transfer from the crossbar interface 3-1 to the crossbar interface 3-2 through the crossbar switch 2 in the conventional network system 1 illustrated in FIG. 1. Further, in FIG. 4, Bx indicates the simulation result of the performance evaluation of the process of matching the communication channel that does not pass through the crossbar switch 12 and passes directly through the bypass route 14-1 to the X-coordinate of the destination node coordinates, By indicates the simulation result of the performance evaluation of the process of matching the communication channel that does not pass through the crossbar switch 12 and passes directly through the bypass route 14-1 to the Y-coordinate of the destination node coordinates, and B-1 indicates the simulation result of the performance evaluation of the packet transfer from the crossbar interface 13-1 to the crossbar interface 13-2 directly through the bypass route 14-1 without passing through the crossbar switch 12. It was confirmed from a comparison of the simulation results A-1 and B-1 that the performance is improved by 10% for the simulation result B-1 than the simulation result A-1. The simulation results in FIG. 4 were computed with respect to normalized packet transfer speeds (or rates).

Figure 5:
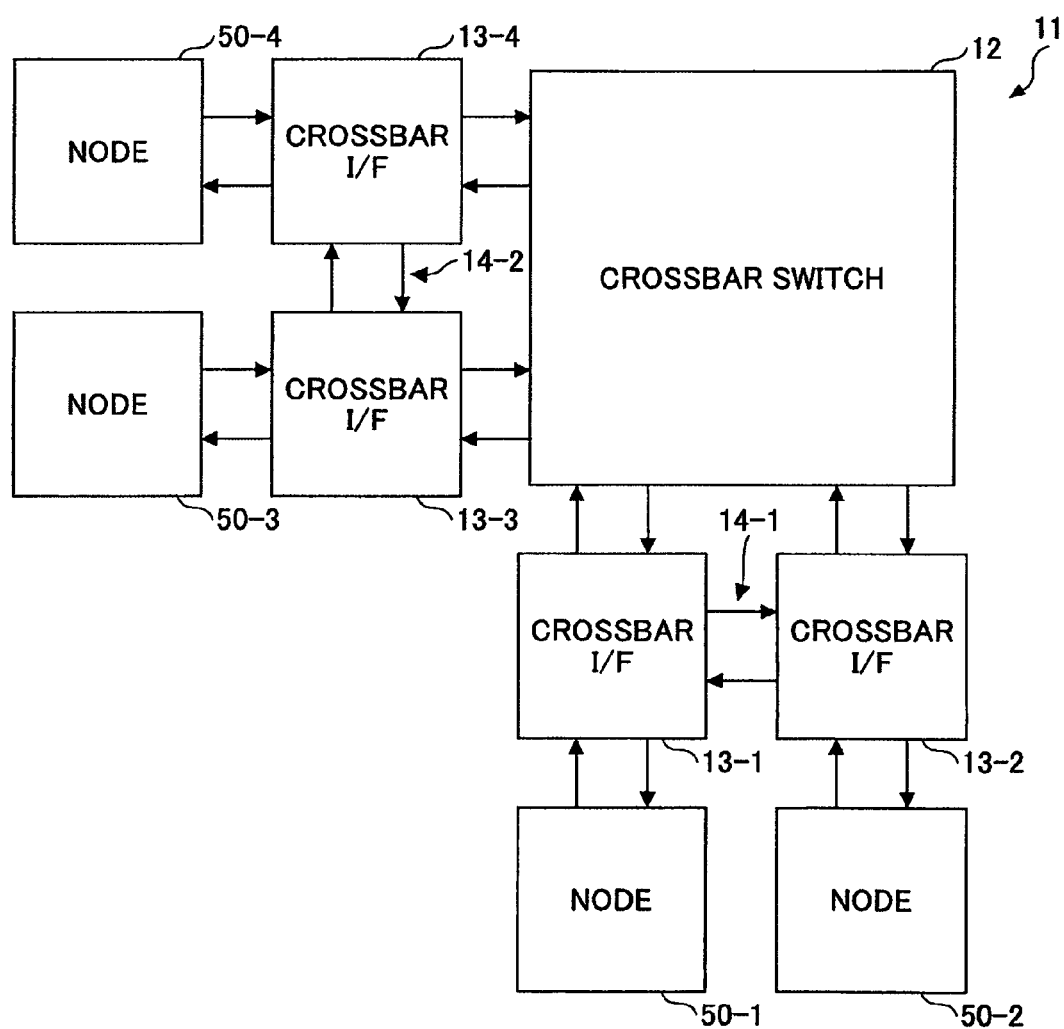
FIG. 5 is a block diagram for explaining another example of the network system in the embodiment.

FIG. 5 is a block diagram for explaining another example of the network system in the embodiment. FIG. 5 illustrates a network system 11 using a topology selected from a group including the two-dimensional mesh torus topology, the two-dimensional line torus topology, the two-dimensional mesh ring topology, and the two-dimensional line ring topology. In FIG. 5, those parts that are the same as those corresponding parts in FIG. 2 are designated by the same reference numerals, and a description thereof will be omitted.

The example illustrated in FIG. 5 employs a communication channel selecting algorithm in which the number of communications among the ports of the same axis is large compared to the number of other communications among the ports of mutually different axes. Hence, a crossbar interface 13-1 having ports of the +X-axis and a crossbar interface 13-2 having ports of the −X-axis are connected by a bypass route 14-1. In addition, a crossbar interface 13-3 having ports of the +Y-axis and a crossbar interface 13-4 having ports of the −Y-axis are connected by a bypass route 14-2. The ports of the +X-axis and the −X-axis of the crossbar interfaces 13-1 and 13-2 refer to the ports that are connected to the corresponding ports of the X-axis of the crossbar switch 12. Similarly, the ports of the +Y-axis and the −Y-axis of the crossbar interfaces 13-3 and 13-4 refer to the ports that are connected to the corresponding ports of the Y-axis of the crossbar switch 12. The ports of the +X-axis, −X-axis, +Y-axis, and −Y-axis of the crossbar interfaces 13-1 through 13-4 are port names that are assigned to the ports for the sake of convenience.

Figure 6:
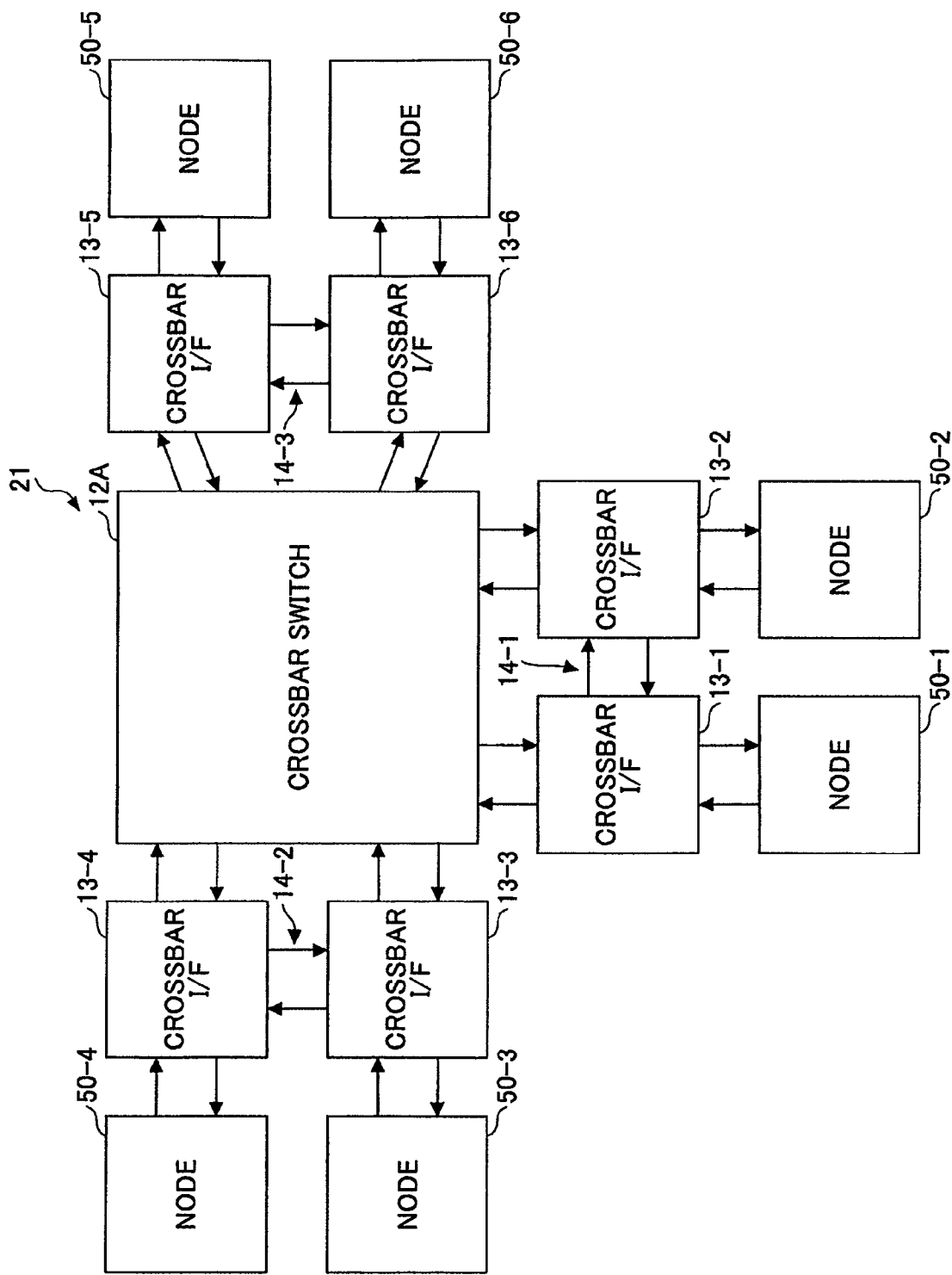
FIG. 6 is a block diagram for explaining another example of the network system in the embodiment.

FIG. 6 is a block diagram for explaining another example of the network system in the embodiment. FIG. 6 illustrates a network system 21 using a topology selected from a group including the three-dimensional mesh torus topology, the three-dimensional line torus topology, the three-dimensional mesh ring topology, and the three-dimensional line ring topology. In FIG. 6, those parts that are the same as those corresponding parts in FIG. 5 are designated by the same reference numerals, and a description thereof will be omitted.

Crossbar interfaces 13-5 and 13-6 are connected to a crossbar switch 12A illustrated in FIG. 6, in addition to crossbar interfaces 13-1 through 13-4. The example illustrated in FIG. 6 employs a communication channel selecting algorithm in which the number of communications among the ports of the same axis is large compared to the number of other communications among the ports of mutually different axes. Hence, the crossbar interface 13-5 having ports of the +Z-axis and the crossbar interface 13-6 having ports of the −Z-axis are connected by a bypass route 14-3. The ports of the +Z-axis and the −Z-axis of the crossbar interfaces 13-5 and 13-6 refer to the ports that are connected to the corresponding ports of the Z-axis of the crossbar switch 12A.

The crossbar interfaces 13-5 and 13-6 forming the ports are connected between the crossbar switch 12A and corresponding nodes 50-5 and 50-6. The nodes 50-5 and 50-6 may be computing nodes or I/O nodes, and in this example, at least one of the nodes 50-5 and 50-6 is a computing node. The network system 21 and the six nodes 50-1 through 50-6 form an information processing apparatus, and a parallel computer is formed if two or more nodes among the nodes 50-1 through 50-6 are formed by computing nodes. In other words, the information processing apparatus includes the crossbar switch 12A, the crossbar interfaces 13-1 through 13-6, the bypass routes 14-1 through 14-3, and the nodes 50-1 through 50-6.

Figure 7:
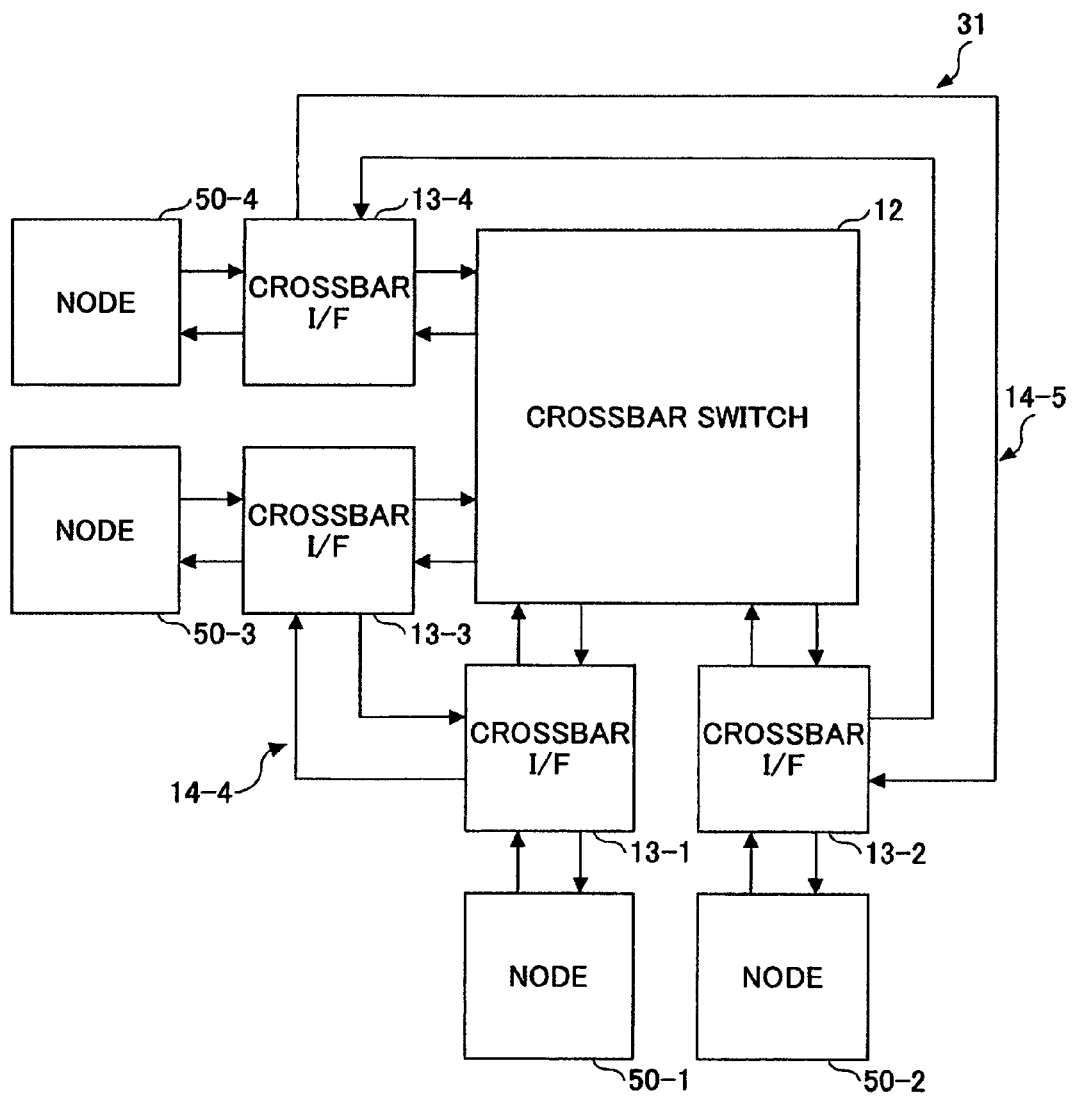
FIG. 7 is a block diagram for explaining another example of the network system in the embodiment.

FIG. 7 is a block diagram for explaining another example of the network system in the embodiment. FIG. 7 illustrates a network system 31 using a topology selected from a group including the two-dimensional mesh torus topology, the two-dimensional line torus topology, the two-dimensional mesh ring topology, and the two-dimensional line ring topology. In FIG. 7, those parts that are the same as those corresponding parts in FIG. 5 are designated by the same reference numerals, and a description thereof will be omitted.

The example illustrated in FIG. 7 employs a communication channel selecting algorithm in which the number of communications among the ports of mutually different axes is large compared to the number of other communications among the ports of the same axis. Hence, a crossbar interface 13-1 having ports of the +X-axis and a crossbar interface 13-3 having ports of the +Y-axis are connected by a bypass route 14-4. In addition, a crossbar interface 13-2 having ports of the −X-axis and a crossbar interface 13-4 having ports of the −Y-axis are connected by a bypass route 14-5.

Figure 8:
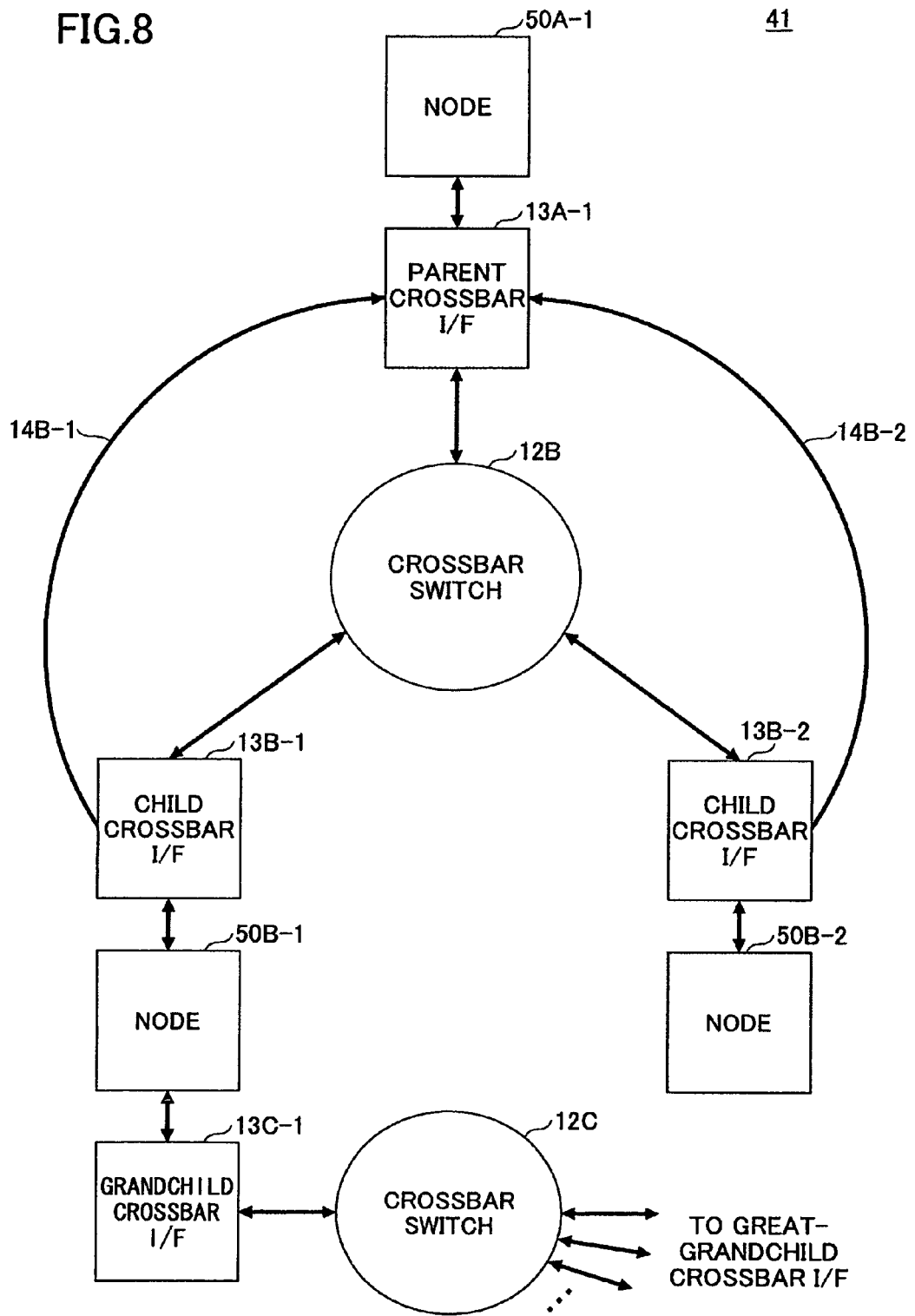
FIG. 8 is a block diagram for explaining another example of the network system in the embodiment.

FIG. 8 is a block diagram for explaining another example of the network system in the embodiment. FIG. 8 illustrates a network system 41 using a tree-type topology. A parent crossbar interface 13A-1 and child crossbar interfaces 13B-1 and 13B-2 are connected to a crossbar switch 12B. A tree structure is formed by the parent crossbar interface 13A-1 that branches to the child crossbar interfaces 13B-1 and 13B-2 through the crossbar switch 12B. This example employs a communication channel selecting algorithm in which the number of communications from the ports of the child crossbar interfaces 13B-1 and 13B-2 to the ports of the parent crossbar interface 13A-1 is large compared to the number of communications among the ports of the child crossbar interfaces 13B-1 and 13B-2. Hence, the ports of the child crossbar interface 13B-1 are connected to the ports of the parent crossbar interface 13A-1 by a bypass route 14B-1. In addition, the ports of the child crossbar interface 13B-2 are connected to the ports of the parent crossbar interface 13A-1 by a bypass route 14B-2. In this example, the bypass routes 14B-1 and 14B-2 are provided from the ports of the child crossbar interfaces 13B-1 and 13B-2 to the parent crossbar interface 13A-1, however, it is of course possible to further provide bypass routers from the ports of the crossbar interface 13A-1 to the ports of the child crossbar interfaces 13B-1 and 13B-2.

The crossbar interfaces 13A-1, 13B-1 and 13B-2 forming the ports are connected between the crossbar switch 12B and corresponding nodes 50A-1, 50B-1 and 50B-2. The nodes 50A-1, 50B-1 and 50B-2 may be computing nodes or I/O nodes, and in this example, at least one of the nodes 50A-1, 50B-1 and 50B-2 is a computing node. The network system 41 and the three nodes 50A-1, 50B-1 and 50B-2 form an information processing apparatus, and a parallel computer is formed if two or more nodes among the nodes 50A-1, 50B-1 and 50B-2 are formed by computing nodes. In other words, the information processing apparatus includes the crossbar switch 12B, the crossbar interfaces 13A-1, 13B-1 and 13B-2, the bypass routes 14B-1 and 14B-2, and the nodes 50A-1, 50B-1 and 50B-2.

When further providing a grandchild crossbar interface and a great-grandchild crossbar interface in the tree type topology, a grandchild crossbar interface 13C-1 may be connected to the node 50B-1 as illustrated in FIG. 8, and the grandchild crossbar interface 13C-1 may be connected to a great-grandchild crossbar interface (not illustrated) through a crossbar switch 12C. The grandchild crossbar interface 13C-1 and the great-grandchild crossbar interface may have structures similar to those of the crossbar interfaces 13A-1, 13B-1 and 13B-2. Moreover, the crossbar switch 12C may have a structure similar to that of the crossbar switch 12B.

In the network systems 11, 21, 31 and 41 described above, a single bypass route is connected with respect to one crossbar interface. However, two or more bypass routes may be connected with respect to one crossbar interface, depending on the communication channel selecting algorithm that is employed, in order to connect two or more crossbar interfaces. In the network system 21 illustrated in FIG. 6, for example, the crossbar interface 13-1 having the ports of the +X-axis may be connected to the crossbar interface 13-5 having the ports of the +Z-axis may be connected by a bypass route.

FIG. 9 is a block diagram for explaining an example of the crossbar interface. It is assumed for the sake of convenience that the number of bypass routes 14 connected to a crossbar interface 13 in FIG. 9 is one. The crossbar interface 13 includes a crossbar receiving part 131, an external interface 132, a header interpreting part 133, and a crossbar transmitting part 134 that are connected as illustrated in FIG. 9.

The crossbar receiving part 131 receives packets from the crossbar switch 12 and packets from the bypass route 14. An exclusive control is carried out in advance with respect to the crossbar interface 13 in order to select the communication channel through which the packets are to be transferred depending on the communication protocol that is used, to one of the communication channel passing through the crossbar switch 12 and the communication channel passing through the bypass route 14. For this reason, the crossbar receiving part 131 supplies to the external interface 132 the packets received from the crossbar switch 12 or the packets received from the bypass route 14 according to the exclusive control.

The external interface 132 is connected to a node 50. The node 50 is formed by a computing node or an I/O node. The node 50 outputs the packets received from the crossbar receiving part 131 to the node 50, and supplies packets received from the node 50 to the header interpreting part 133. The node 50 may be formed by a CPU that is mounted on a system board (not illustrated) forming a parallel computer together with a memory (not illustrated), for example. In addition, the node 50 may be formed by an I/O interface that is mounted on an I/O board which is separate from the system board.

The header interpreting part 133 recognizes the target (or destination) node coordinates, that is, destination information of the packet, based on routing information included in the header of the packet received from the external interface 132, and determines the X-coordinate and the Y-coordinate of the port to which the packet is to be transferred. The routing information included in the header may include source information (for example, a source address) indicating the source that issued the packet, in addition to the destination information (for example, a destination address) indicating the destination to which the packet is to be transferred.

When the crossbar transmitting part 134 issues a request (or transmission request) and receives from the crossbar switch 12 a grant that grants a packet transmission, the crossbar transmitting part 134 outputs to the crossbar switch 12 the packet that is received from the external interface 132 via the head interpreting part 133. On the other hand, if the crossbar transmitting part 134 issues a request but a grant that grants a packet transmission is not received from the crossbar switch 12, the crossbar transmitting part 134 outputs to the bypass route 14 the packet that is received from the external interface 132 via the head interpreting part 133, and not to the crossbar switch 12.

The crossbar transmitting part 134 may have a structure in which a plurality of buffers (not illustrated) respectively formed by a FIFO (First-In-First-Out) or the like are connected in parallel. In this case, the crossbar transmitting part 134 may hold the packet within the buffers until a grant is received from the crossbar switch 12 in response to the request issued from the crossbar transmitting part 134. When the crossbar interface 13 has a virtual channel using such buffers, the data passing through the bypass route 14 and other data passing through the crossbar switch 12 may be transmitted simultaneously, that is, in parallel, in order to substantially increase the bandwidth.

In a case where two or more bypass routes are connected to the crossbar interface, the structure illustrated in FIG. 9 is of course provided with respect to each bypass route.

The parallel computer generally includes ports for the network and ports for the CPU, and may sometimes include ports for the I/O node. If it is assumed for the sake of convenience that the port names of the CPU are CPU0 and CPU1, the port names of the I/O node are 100 and 101, and the DOR (Dimension Order Routing) is employed, the ports CPU0 and CPU1 of the CPU have a high possibility of communicating with the ports of the +X-axis and −X-axis. For this reason, bypass routes may be provided by regarding the ports CPU0 and the ports of the +X-axis as a set (or group) and the ports CPU1 and the ports of the −X-axis as a set (or group), as illustrated in FIG. 5 or FIG. 6. In this case, it is effective to additionally employ an algorithm that inputs to the ports CPU0 of the CPU the data output to the ports of the +X-axis on the CPU side.

In addition, when the DOR (Dimension Order Routing) is employed, there is a high possibility that the I/O node will communicate with the ports of the Z-axis. Hence, bypass routes may be provided by regarding the ports 100 and the ports of the +Z-axis as a set (or group) and the ports 101 and the ports of the −Z-axis as a set (or group).

Of course, the network system of the embodiments described above are not only applicable to the communications of the parallel computer, and may be similarly applied to the communications of computers or information processing apparatuses in general.

FIG. 10 is a flow chart for explaining an operation of the crossbar switch, that is, an arbitration process. For the sake of convenience, a description will be given of the operation of the crossbar switch 12 illustrated in FIG. 5.

In FIG. 10, a step S21 confirms a request from the ports of the +X-axis, the −X-axis, the +Y-axis and the −Y-axis, and a step S22 decides whether a packet is received from the port of one of the +X-axis, the −X-axis, the +Y-axis and the −Y-axis. The request indicates the output port from which the crossbar switch 12 is to output the packet received from the input port. If the decision result in the step S22 is YES, a step S23 does not issue a grant granting a packet transmission to one of the +X-axis, the −X-axis, the +Y-axis and the −Y-axis, and the process advances to a step S34. The step S34 decides whether or not the received packet has ended, and the process returns to the step S21 if the decision result in the step S34 is YES.

If the decision result in the step S22 is NO, a step S24 decides whether a request is received from the port of the +X-axis. The process advances to a step S25 if the decision result in the step S24 is YES, and advances to a step S26 if the decision result in the step S24 is NO. The step S25 issues a grant granting a packet transmission to the +X-axis, and the process advances to a step S33 which will be described later. The step S26 decides whether a request is received from the port of the −X-axis. The process advances to a step S27 if the decision result in the step S26 is YES, and advances to a step S28 if the decision result in the step S26 is NO. The step S27 issues a grant granting a packet transmission to the −X-axis, and the process advances to the step S33. The step S28 decides whether a request is received from the port of the +Y-axis. The process advances to a step S29 if the decision result in the step S28 is YES, and advances to a step S30 if the decision result in the step S28 is NO. The step S29 issues a grant granting a packet transmission to the +Y-axis, and the process advances to the step S33 which will be described later. The step S30 decides whether a request is received from the port of the −Y-axis. The process advances to a step S31 if the decision result in the step S30 is YES, and advances to the step S32 if the decision result in the step S30 is NO. The step S31 issues a grant granting a packet transmission to the −Y-axis, and the process advances to the step S33 which will be described later. The step S32 does not issue a grant granting a packet transmission to one of the +X-axis, the −X-axis, the +Y-axis and the −Y-axis, and the process returns to the step 21.

The step S33 decides whether the processing of the request has ended. The process returns to the step S21 if the decision result in the step S33 is YES.

Accordingly, if the crossbar switch 12 receives the request in a state where no packet is received, the crossbar switch 12 issues a grant granting a packet transmission to the source of the request. The arbitration process described above may be executed in an output port part within the crossbar switch 12.

Further, the present invention is not limited to these embodiments, but various variations and modifications may be made without departing from the scope of the present invention.

What is claimed is:

1. An information processing apparatus comprising:
   a crossbar switch;
   a plurality of crossbar interfaces having ports coupled to the crossbar switch, wherein each of the plurality of crossbar interfaces belongs to one of a plurality of groups;
   a bypass route directly and exclusively coupling a first crossbar interface and a second crossbar interface that belong to a single group in which a frequency of use of the ports is greater than or equal to a predetermined value amongst the plurality of crossbar interfaces; and
   a plurality of computing nodes coupled to the crossbar switch via the plurality of crossbar interfaces,
   wherein
   the plurality of computing nodes include a first computing node configured to perform a first computation and to transmit a packet,
   the first crossbar interface is coupled to the first computing node and is configured to transfer the packet transmitted from the first computing node,
   the crossbar switch is configured to receive the packet from the first computing node and to switch a communication channel of the packet,
   the second crossbar interface is coupled between the crossbar switch and the first crossbar interface, and is configured to transfer the packet from the crossbar switch or the first crossbar interface,
   the plurality of computing nodes include a second computing node configured to receive the packet from the second crossbar interface coupled thereto and to perform a second computation,
   the first crossbar interface and the second crossbar interface belong to the single group and are directly coupled by the bypass route,
   the ports of the first crossbar interface and the ports of the second crossbar interface are respectively coupled directly to the crossbar switch, and
   the second crossbar interface simultaneously receives the packet from the crossbar switch and the packet from the first crossbar interface.

2. The information processing apparatus as claimed in claim 1, wherein
   the second crossbar interface includes a crossbar transmitting part coupled to the crossbar switch and the second crossbar interface, and
   the crossbar transmitting part outputs to the crossbar switch a packet that is received from the second computing node when the crossbar transmitting part issues a request and receives from the crossbar switch a grant that grants a packet transmission, and outputs to the first crossbar interface the packet that is received from the second computing node, and not to the crossbar switch, when the crossbar transmitting part issues a request but a grant that grants a packet transmission is not received from the crossbar switch.

3. The information processing apparatus as claimed in claim 1, comprising:
   another crossbar switch,
   wherein the plurality of crossbar interfaces include a third crossbar interface having ports coupled to the other crossbar switch,
   wherein the third crossbar interface is coupled to the second crossbar interface.

4. The information processing apparatus as claimed in claim 3, wherein the second computing node is coupled between the second and third crossbar interfaces.

5. A control method for a network system, comprising:
   transmitting a packet from a first computing node configured to perform a first computation;
   transferring a packet transmitted from the first computing node by a first crossbar interface that is coupled to the first computing node;
   receiving, by a crossbar switch, the packet from the first computing node that is coupled to the crossbar switch, and switching a communication channel of the packet from the first computing node;
   transferring the packet from the crossbar switch or the first crossbar interface by a second crossbar interface that is coupled to the crossbar switch and the first crossbar interface; and
   receiving the packet transferred by the second crossbar interface by a second computing node configured to perform a second computation,
   wherein the first crossbar interface has ports coupled directly to the crossbar switch,
   wherein the second crossbar interface has ports coupled directly to the crossbar switch,
   wherein the transferring the packet from the first crossbar interface by the second crossbar interface is performed via a bypass route directly and exclusively coupling the first crossbar interface and the second crossbar interface, and
   wherein the second crossbar interface simultaneously receives the packet from the crossbar switch and the packet from the first crossbar interface.

6. The control method for the network system as claimed in claim 5, wherein the second crossbar interface includes a crossbar transmitting part coupled to the crossbar switch and the second crossbar interface, and the crossbar transmitting part outputs to the crossbar switch a packet that is received from the second computing node when the crossbar transmitting part issues a request and receives from the crossbar switch a grant that grants a packet transmission, and outputs to the first crossbar interface the packet that is received from the second computing node, and not to the crossbar switch, when the crossbar transmitting part issues a request but a grant that grants a packet transmission is not received from the crossbar switch.

7. The control method as claimed in claim 5, comprising: transmitting the packet received by the second computing node to a third crossbar interface.

8. The control method as claimed in claim 7, comprising: transferring the packet transmitted from the second computing node by a third crossbar interface that is coupled to the second computing node; and receiving, by another crossbar switch, the packet from the second computing node via the third crossbar interface, and switching a communication channel of the packet from the second computing node.

9. A network system comprising:

a crossbar switch;

a plurality of crossbar interfaces having ports coupled to the crossbar switch, wherein each of the plurality of crossbar interfaces belongs to one of a plurality of groups; and a bypass route directly and exclusively coupling a first crossbar interface and a second crossbar interface that belong to a single group in which a frequency of use of the ports is greater than or equal to a predetermined value amongst the plurality of crossbar interfaces, wherein the ports of the first crossbar interface and the ports of the second crossbar interface are respectively coupled directly to the crossbar switch, and wherein the second crossbar interface simultaneously receives a packet from the crossbar switch and a packet from the first crossbar interface.

10. The network system as claimed in claim 9, wherein the first and second crossbar interfaces are determined based on a communication channel selecting algorithm.

11. The network system as claimed in claim 10, wherein the communication channel selecting algorithm uses a DOR (Dimension Order Routing) as the communication channel selecting algorithm, and the first and second crossbar interfaces form ports of an axis identical to that of node coordinates of a destination of data.

12. The network system as claimed in claim 10, wherein the first and second crossbar interfaces form ports of an axis different from that of node coordinates of a destination of data.

13. The network system as claimed in claim 9, wherein each of the plurality of crossbar interfaces is coupled between the crossbar switch and one of a processor node and an input and output node.

14. The network system as claimed in claim 13, wherein each of the plurality of crossbar interfaces includes a crossbar transmitting part coupled to the crossbar switch and the bypass route, and the crossbar transmitting part outputs to the crossbar switch a packet that is received from said one of the processor node and the input and output node when the crossbar transmitting part issues a request and receives from the crossbar switch a grant that grants a packet transmission, and outputs to the bypass route the packet that is received from said one of the processor node and the input and output node, and not to the crossbar switch, when the crossbar transmitting part issues a request but a grant that grants a packet transmission is not received from the crossbar switch.

15. The network system as claimed in claim 9, comprising: another crossbar switch, wherein the plurality of crossbar interfaces include a third crossbar interface having ports coupled to the other crossbar switch, and wherein the third crossbar interface is coupled to the second crossbar interface.

16. The network system as claimed in claim 15, comprising:

a node coupled between the second and third crossbar interfaces, wherein the node includes one of a processor node and an input and output node.

* * * * *